United States Patent
Dorenbosch (10) Patent No.: US 6,717,520 B1
(45) Date of Patent: Apr. 6, 2004

(54) METHOD AND APPARATUS FOR SELECTIVELY PROVIDING AN AUDIBLE LOW POWER ALERT TO A USER OF AN ELECTRONIC DEVICE

(75) Inventor: Jheroen P. Dorenbosch, Paradise, TX (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 10/247,229

(22) Filed: Sep. 19, 2002

(51) Int. Cl.[7] .................... G08B 21/00; G04B 47/00; G04C 11/02; G04C 21/16; G04C 23/14
(52) U.S. Cl. ................. 340/636.1; 340/7.37; 340/7.58; 368/10; 368/47; 368/251
(58) Field of Search .................... 340/636.1, 309.16, 340/309.3, 309.7–309.9, 7.37, 7.38, 7.58, 7.62; 368/10, 13, 14, 244–249, 261, 263

(56) References Cited

U.S. PATENT DOCUMENTS

| | | | | |
|---|---|---|---|---|
| 5,442,345 A | * | 8/1995 | Kwon | 340/7.37 |
| 5,463,368 A | | 10/1995 | Tsunoda et al. | |
| 5,534,765 A | | 7/1996 | Kreisinger et al. | |
| 5,783,998 A | * | 7/1998 | Nakajou et al. | 340/636.15 |
| 5,805,530 A | * | 9/1998 | Youngberg | 368/47 |
| 5,828,312 A | * | 10/1998 | Yamazaki | 340/7.58 |
| 5,905,437 A | * | 5/1999 | Takahashi | 340/636.1 |
| 6,175,721 B1 | * | 1/2001 | Hayato | 340/7.58 |
| 6,184,651 B1 | | 2/2001 | Fernandez et al. | |
| 6,252,511 B1 | * | 6/2001 | Mondshine et al. | 340/636.1 |
| 6,252,516 B1 | * | 6/2001 | Mottier et al. | 340/7.6 |
| 6,316,916 B2 | | 11/2001 | Bohne | |
| 6,320,354 B1 | | 11/2001 | Sengupta et al. | |
| 6,384,578 B1 | | 5/2002 | Patino et al. | |
| 6,477,117 B1 | * | 11/2002 | Narayanaswami et al. | 368/251 |
| 2003/0169151 A1 | * | 9/2003 | Ebling et al. | 340/7.58 |

\* cited by examiner

*Primary Examiner*—Jeffery Hofsass
*Assistant Examiner*—Anne V. Lai
(74) *Attorney, Agent, or Firm*—Sylvia Chen; Daniel C. Crilly (57) ABSTRACT

An electronic device (103, 200) employs a method and apparatus for selectively audibly alerting a user as to the status of the device's DC power source (119). The device receives input from the user indicating a time period during which the audible low power alert is not to be emanated from the device. After receiving such input, the device determines whether a low power condition exists during the time period and deactivates the audible low power alert if such a condition is met. Alternatively or additionally, after receiving the time period input from the user, the device may determine the likelihood of a low power condition occurring during the time period and activate the audible alert prior to commencement of the time period if such a condition is likely to occur, thereby providing the user advance notice of the potential for such a condition.

20 Claims, 4 Drawing Sheets

METHOD AND APPARATUS FOR SELECTIVELY PROVIDING AN AUDIBLE LOW POWER ALERT TO A USER OF AN ELECTRONIC DEVICE

FIELD OF THE INVENTION

The present invention relates generally to battery-powered electronic devices, and, in particular, to selectively audibly alerting a user as to the status of the direct current (DC) power source of such a device.

BACKGROUND OF THE INVENTION

High technology, battery-powered electronic devices are prevalent in today's society. Such devices include cellular telephones, portable compact disk (CD) players, portable digital versatile disk (DVD) players, personal two-way radios, personal digital assistants (PDAs), laptop computers, and camcorders, just to name a few. Many of these devices typically provide an audible alert to let the device user know when the battery power level is getting low to enable the user to take appropriate action (e.g., save his work, end a call, turn off the unit, and so forth) before exhausting the battery. The alert is also used as a reminder to recharge or change the battery, as applicable.

While the audible alert is a very useful feature, it can also be an annoyance when the alert sounds at certain times. For example, when a person leaves his or her cellular phone on the nightstand next to the bed and the alert sounds at two o'clock in the morning, the person may not necessarily appreciate the feature he or she finds so useful during the day. As an additional example, when the user enters a meeting, he or she may not appreciate the low battery alert sounding during the meeting.

Some cellular phones include a feature that allows a user to switch from an audible alert (e.g., ring or ring tone) to a tactile alert (e.g., vibration) for purposes of informing the user of the phone's receipt of an incoming call. Other cellular phones include a feature that allows the user to assign the type of incoming call alert used (audible or tactile) to the user's environment as part of the so-called "style" settings of the phone. For example, the phone user might set an audible incoming call alert for "normal" use and a tactile incoming call alert for "meeting" use.

While these approaches allow the user to silence the audible incoming call alert in real time or to coincide with an environment setting, none of these approaches apply to the low battery alert. In addition, all of these approaches require the user to remember, at the appropriate time (e.g., before going to bed, before entering the meeting, and so on), to change the audible alert to the tactile alert or change the phone's style settings to match the new environment. Failure to remember can result in undesirable emanation of the audible alert. Further, since existing alert changing techniques focus on the mechanism for alerting the user of an unpredictable event (i.e., receipt of an incoming call), none of the existing techniques estimate the likelihood of the event and alert the user proactively prior to the event.

Therefore, a need exists for a method and apparatus for selectively providing an audible low power alert to a user of an electronic device that overcome the alerting deficiencies of the prior art.

DETAILED DESCRIPTION OF A PREFERRED EMBODIMENT

Generally, the present invention encompasses a method and apparatus for selectively providing an audible low power alert to a user of an electronic device. The electronic device receives (e.g., via a user interface) input from the user indicating a time period during which the audible low power alert is not to be emanated from the device (e.g., via its speaker). After receiving such input, the device (e.g., via operation of its processor) regularly examines the power output of the DC power source and determines whether a low power condition exists. If a low power condition occurs during the time period, the device deactivates the audible low power alert, thereby silencing the alert during the time period. Alternatively or additionally, upon receipt of the time period from the user, the device may determine the likelihood of a low power condition occurring during the time period and activate the audible alert prior to commencement of the time period if such a condition is likely to occur during the time period. The selective deactivation of the audible low power alert is applicable to all electronic devices that include such an alert, including without limitation, wireless communication devices, such as cellular telephones, pagers, two-way radios, personal digital assistants, laptop computers (with embedded or insertable wireless local area network transceiver cards), portable instant messaging devices, and any devices that include the functionality of any one or more of the foregoing devices.

By using the selective audible low power alert technique of the present invention, electronic devices may be programmed to refrain from emanating audible low power alerts during time periods specified by the device users (a feature not currently available in existing electronic devices that have audible low battery alerts), without having to remember to change settings just prior to the time period. In addition, in accordance with the present invention, electronic devices may be further programmed to provide audible low power alerts prior to commencement of the user-defined time periods in order to inform the device users of the potential for a low DC power condition occurring during such time periods.

Figure 1:
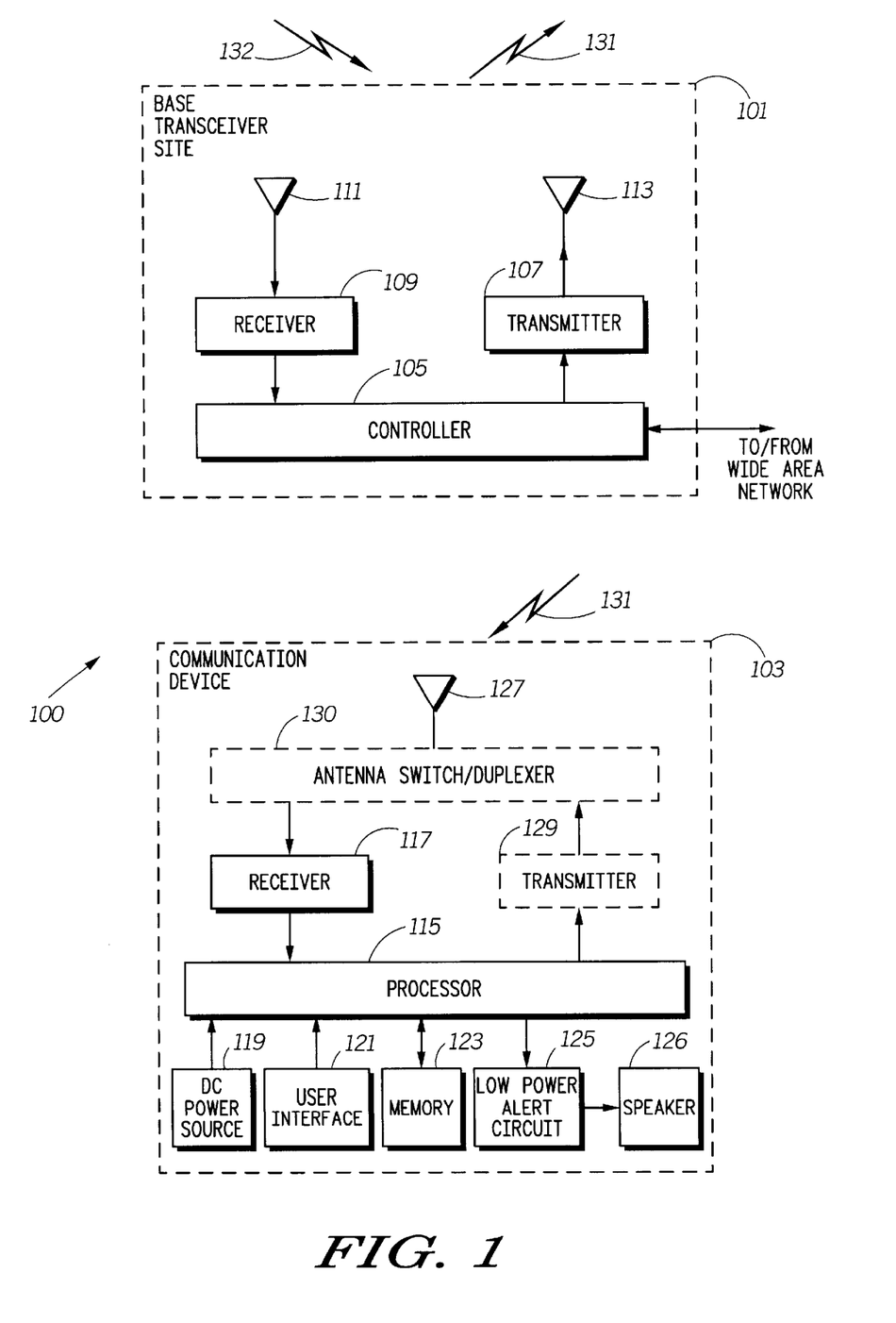
FIG. 1 is an electrical block diagram of a wireless communication system that selectively provides an audible low power alert in accordance with a preferred embodiment of the present invention.

The present invention can be more fully understood with reference to FIGS. 1–4, in which like reference numerals designate like items. FIG. 1 is an electrical block diagram of a wireless communication system 100 that selectively provides an audible low power alert in accordance with a preferred embodiment of the present invention. The communication system 100 includes one or more base transceiver sites (BTS) 101 (one shown) and one or more wireless communication devices 103 (one shown). The communication system 100 may be any conventional analog or digital communication system, such as a cellular telephone system or a wireless messaging or paging system.

The BTS 101 preferably includes, inter alia, a controller 105, a transmitter 107, a receiver 109 and one or more antennas 111, 113 (two shown). The controller 107 is a conventional base site or paging controller that controls the operation of, among other things, the transmitter 107 and the receiver 109. The receiver 109 is a conventional receiver that is capable of receiving time information signals 129 from a time source, such as a global positioning satellite (GPS). The transmitter 107 is a conventional transmitter capable of transmitting signals 131 over radio channels using a modulation and transmission protocol applicable to the particular system. Antenna 111 is preferably a conventional antenna designed and configured to receive time information signals from a GPS satellite. Antenna 113 is preferably a conventional antenna designed and configured to facilitate radio transmissions at the radio or microwave frequencies used in the communication system 100. Depending on the operating frequencies of the communication system 100 and antenna bandwidth, antennas 111 and 113 may be implemented as a single antenna using conventional broadbanding techniques. The BTS 101 may include other receivers and components in accordance with known techniques, but only those BTS components necessary for an understanding of the present invention have been shown in block form in FIG. 1. Thus, as is apparent from the forgoing, the BTS 101 is a conventional BTS; thus no further discussion of the individual BTS components will be provided except to facilitate an understanding of the present invention.

The wireless communication device 103 is preferably a conventional communication device, such as a cellular telephone, pager, personal digital assistant, instant messaging device, laptop computer, or two-way radio, programmed to operate in accordance with the present invention. The communication device 103 includes, inter alia, a processor 115, a receiver 117, a DC power source 119, a user interface 121, memory 123, a low power alert circuit 125, a speaker 126, and an antenna 127. In the event that the communication device 103 is a two-way device, the communication device 103 may optionally include a transmitter 129 and an antenna switch, duplexer, circulator or other means of isolating the receiver 117 from the transmitter 129 in accordance with known techniques (referred to herein as "antenna switch/duplexer 130").

The processor 115 preferably includes one or more microprocessors, microcontrollers, digital signal processors (DSPs), state machines, logic circuitry, or any other device or devices that process information based on operational or programming instructions. Such operational or programming instructions are preferably stored in the memory 123, which memory 123 may be an integrated circuit (IC) memory chip containing any form of random access memory (RAM) or read only memory (ROM), a floppy disk, a compact disk read only memory (CD-ROM), a digital versatile disk (DVD), a flash memory card or any other medium for storing digital information. One of ordinary skill in the art will recognize that when the processor 115 has one or more of its functions performed by a state machine or logic circuitry, the memory 123 containing the corresponding operational instructions may be embedded within the state machine or logic circuitry. The operations performed by the processor 115 and the rest of the wireless communication device components are described in detail below.

The transmitter 129 (when included) and the receiver 117 are well-known components of two-way wireless communication devices. The transmitter 129 and the receiver 117 enable the communication device 103 to communicate information (voice and/or data) to and acquire information from the BTS 101. In this regard, the transmitter 129 and the receiver 117 include appropriate, conventional circuitry to enable digital or analog transmissions over a wireless communication channel.

The implementations of the transmitter 129 and the receiver 117 depend on the implementation of the wireless device 103. For example, the transmitter 129 and the receiver 117 may be implemented as an appropriate wireless modem, or as conventional transmitting and receiving components of two-way wireless devices. In the event that the transmitter 129 and the receiver 117 are implemented as a wireless modem, the modem may be internal to the wireless device 103 or insertable into the wireless device 103 (e.g., embodied in a wireless radio frequency (RF) modem implemented on a wireless transceiver card that complies with the Personal Computer Memory Card International Association (PCMCIA) standard). For a wireless cellular telephone, pager or two-way radio, the transmitter 129 and the receiver 117 are preferably implemented as part of the wireless device hardware and software architecture in accordance with known techniques. One of ordinary skill in the art will recognize that most, if not all, of the functions of the transmitter 129 and/or the receiver 117 may be implemented in a processor, such as processor 115. However, the processor 115, the transmitter 129, and the receiver 117 have been artificially partitioned herein to facilitate a better understanding of the present invention.

The DC power source 119 preferably comprises a single battery or an arrangement of batteries, although other DC power sources, such as fuel cells may be utilized. The user interface 121 is preferably a graphical user interface (GUI), although other conventional interfaces, such as function buttons, may be used. The speaker 126 is preferably a conventional audio speaker, and the low power alert circuit 125 is preferably a conventional digital and analog circuit that creates an audio alert signal (e.g., a tone, a series of tones, a synthesized voice message or some other form of alert signal) in response to input from the processor 115. Depending on the particular implementation of the communication device 103, the receiver and/or the low power alert circuit 125 may be integrated wholly or partially into an integrated circuit (e.g., an application specific integrated circuit (ASIC)) that contains the processor 115.

Operation of the wireless communication system 100 occurs substantially as follows in accordance with a preferred embodiment of the present invention. The GPS antenna 111 receives a signal 132 containing embedded absolute time information from a GPS satellite (not shown). The received signal is conducted to the receiver 109 for conventional demodulation, decoding and other processing to recover the time information. The time information is then forwarded to the controller 105. The controller 105 reformats the time information as necessary for transmission over a radio channel of the system 100 and provides the reformatted time information to the transmitter 107. The transmitter 107 encodes, modulates and amplifies a signal containing the reformatted time information in accordance with known techniques, and supplies the signal to the transmit antenna 113. The transmit antenna 113 radiates the time information signal 131 over a radio frequency channel (e.g., a control channel or a traffic channel) allocated for use in the system 100.

The communication device antenna 127 receives the time information signal 131 over the radio frequency channel and supplies it to the communication device receiver 117 (via the antenna switch/duplexer 130, if applicable). The receiver 117 demodulates, decodes and processes the received signal in accordance with known techniques to recover the time information, and supplies the time information to the processor 115 for use in accordance with the present invention.

In addition to receiving time information from the receiver 117, the wireless communication device 103 receives input from the device user via the user interface 121 indicating a time period during which the user does not want the device's low power alert to emanate from the speaker 126. The time period, also referred to herein as a "silent period", may be indicated in any manner. For example, the user may enter a start time and a stop time to define the silent period. Alternatively, the user may enter a start time and a number of minutes or hours to define the silent period. Still further, the user may indicate an event, such as a meeting, to define the silent period. The event would then correspond to a time period on a calendar stored in a memory of the communication device 103 (e.g., memory 123) or on a calendar stored elsewhere (e.g., on the user's computer), but to which the communication device 103 has intermittent access via an infrared port (not shown), or other wireless or wired link in accordance with known multi-device synchronization techniques.

Having received the indication of the silent period and means for determining the present time, the processor 115, executing operating instructions stored in the memory 123, monitors the DC output power of the DC power source 119 in accordance with conventional techniques. The processor 115 also maintains the present time based on the time information. If the DC output power level falls below a threshold (e.g., eighty percent (80%) of full output power) indicating the presence of a low DC power condition, the processor 115 determines whether the present time of such condition is during the silent period. If the present time is during the silent period, the processor 115 disables (e.g., does not enable) the low power alert circuit 125 to prevent the audible low power alert from being emanated from the speaker 126, notwithstanding the low DC power condition. On the other hand, if the present time is not during the silent period, the processor 115 enables or instructs the low power alert circuit 125 to generate the low power alert signal and supply it to the speaker 126.

In an alternative embodiment, the user may use the user interface 121 to enter different silent periods for different purposes. For example, the user may enter one silent period for purposes of disabling emanation of the low battery or low DC power alert and another time period for purposes of disabling emanation of an audible communication receipt alert (e.g., a ring or ring tone). In such a case, the user may be awake and want to know if his battery is running low, but simultaneously be in a meeting and not want to be bothered by incoming calls or messages. Under this scenario, a silent or tactile alert may be used to notify the user of an incoming call or message in accordance with known techniques. Thus, control of the low DC power alert may be completely independent of control of the incoming call alert.

While the components 115–130 of the wireless communication device 103 and the components 105–113 of the BTS 101 are illustrated as being connected directly together, one of ordinary skill in the art will appreciate that conventional circuits and functional blocks may be inserted between the applicable components 105–113, 115–130 of the BTS 101 and the communication device 103 in accordance with known techniques to implement the full functionality of the particular device 101, 103. Thus, the components 105–113, 115–130 of each device 101, 103 are respectively operably coupled together, either directly as illustrated in FIG. 1 or indirectly, to implement the present invention.

Figure 2:
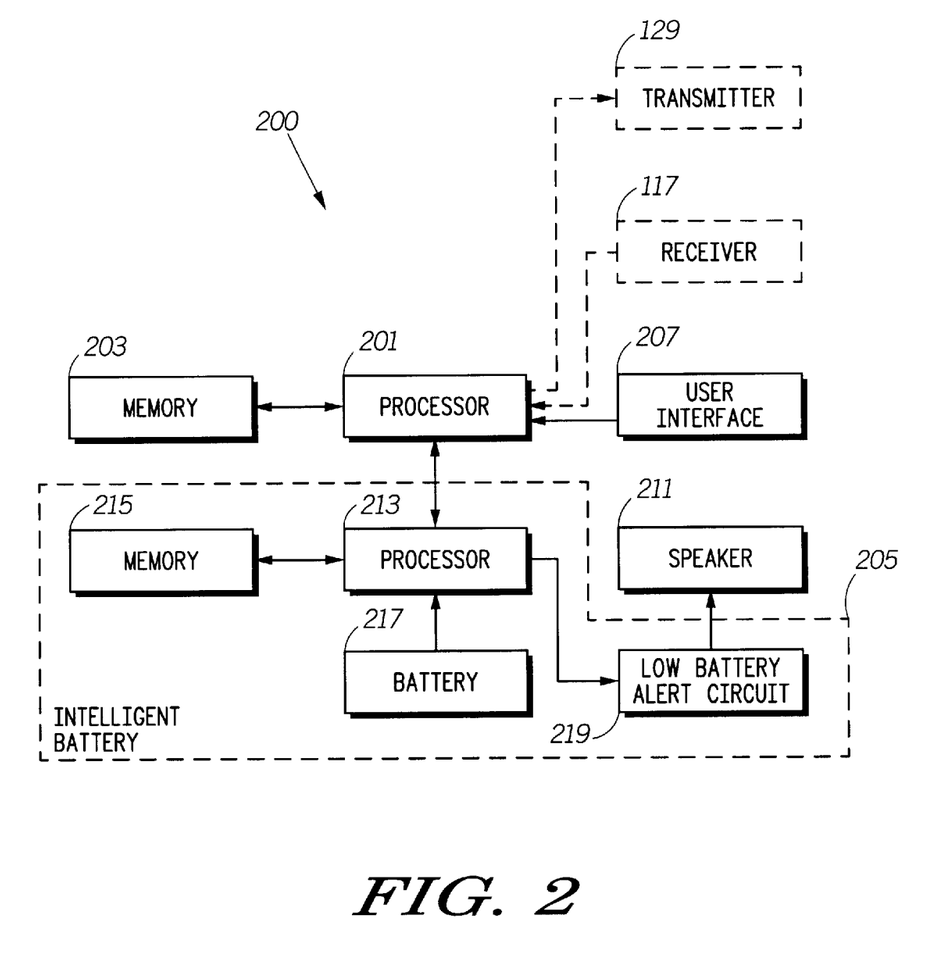
FIG. 2 is an electrical block diagram of an exemplary electronic device that selectively provides an audible low power alert in accordance with the present invention.

FIG. 2 is an electrical block diagram of an exemplary electronic device 200 that selectively provides an audible low power alert in accordance with the present invention. The electronic device 200 includes a processor 201, a memory 203, a DC power source (e.g., an intelligent battery 205), a user interface 207 and a speaker 211. If the electronic device 200 is a wireless communication device, such as a cellular telephone, pager, personal digital assistant, two-way radio, portable computer containing a wireless local area network (LAN) card, or the like, the device 200 may further include a transmitter 129 and/or receiver 117 as described above with respect to FIG. 1. When such a transmitter 129 and/or receiver 117 are so included, they may be wholly or partially integrated into an IC that contains the processor 201 (e.g., an ASIC).

The processor 201 preferably includes one or more microprocessors, microcontrollers, DSPs, state machines, logic circuitry, or any other device or devices that process information based on operational or programming instructions. Such operational or programming instructions are preferably stored in the memory 203, which memory 203 may be an IC memory chip containing any form of RAM or ROM, a floppy disk, a CD-ROM, a DVD, a flash memory card or any other medium for storing digital information. One of ordinary skill in the art will recognize that when the processor 201 has one or more of its functions performed by a state machine or logic circuitry, the memory 203 containing the corresponding operational instructions may be embedded within the state machine or logic circuitry. The operations performed by the processor 201 and the rest of the electronic device components are described in detail below.

The user interface 207 is preferably a graphical user interface (GUI), although other conventional interfaces, such as function buttons, may be used. The speaker 211 is preferably a conventional audio speaker.

The DC power source in this embodiment preferably comprises an intelligent battery device 205 that includes its own processor 213, memory 215, battery 217 and low battery alert circuit 219. The processor 213 may be a processor similar to processor 201 and memory 215 may be a memory similar to memory 203, except that memory 215 stores operating instructions executed by processor 213. The low battery alert circuit 219 is preferably a conventional digital and analog circuit that creates an audio alert signal (e.g., a tone, a series of tones, a synthesized voice message or some other form of alert signal) in response to input from the processor 213.

In an alternative embodiment, a conventional battery (e.g., a nickel-cadmium battery or a nickel-metal-hydride battery) or other DC power source (e.g. fuel cell) may be used, in which case the functionality of processors 201 and 213 may be merged into a single processor, the storage capabilities of memories 203 and 215 may be merged into a single memory, and the low battery alert circuit 219 may form part of the electronic device 200 as illustrated in the communication device 103 of FIG. 1. In either case, depending on the particular implementation of the electronic device 200, the low battery alert circuit 125 may be integrated wholly or partially into an IC that contains the applicable processor (e.g., either processor 213 or the processor implementing both processor 201 and processor 213).

Operation of the electronic device 200 occurs substantially as follows in accordance with the present invention. The user interface 207 receives an input from the device user indicating a time period during which an audible low battery alert is not to be emanated from the device 200. The time period may be a time period during the day or a time period associated with an event. The time period is preferably stored in memory 215 via processors 201 and 213. The electronic device 200 also preferably receives and stores time information that enables the device 200 to determine a present time of day. The time information may be input by the device user via the user interface 207 (e.g., to set a clock maintained by the device 200) or, in the event that the electronic device 200 is a wireless communication device, may be received from a remote controller over a wireless radio channel, as described above with respect to FIG. 1. Alternatively, the time information may be stored in memory 203 during manufacturing of the electronic device 200. In such a case, the time information may be transferred to memory 215 (when separate memories 203, 215 are used) as part of the start-up process executed between the processors 201, 213 after the intelligent battery 205 is connected to supply DC power to the device 200. Still further, the time information or the present time of day may be accessed by the intelligent battery processor 213 from the electronic device processor 201 (when separate processors 201, 213 are used), on an as-needed basis, using conventional inter-processor communication protocols, such as the well-known UNIX inter-processor communication protocol (IPC) or the Intelligent Motorola Portable Radio Energy System (IMPRES) protocol that is used in an IMPRES system that is commercially available from Motorola, Inc. of Schaumburg, Ill., U.S.A. The IMPRES system combines an intelligent battery (e.g., 205) with a processor (e.g., processor 201), and provides for communication between the battery, processor and other accessory devices preferably over a single bus or communication path. The IMPRES system and protocol are more clearly described in U.S. Pat. No. 6,316,916 and U.S. patent application Ser. Nos. 09/699,206, entitled "Communication Protocol for Integrated Smart Energy System", and 09/908,448, entitled "Method to Recall Last Charge State and Resume Charge Process of a Battery Pack Upon Reinsertion", which patent and patent applications are assigned to the assignee of the present invention and incorporated herein by this reference. In such an embodiment, the time information would be preferably stored in memory 203 and not in memory 215.

After acquiring the ability to determine a present time of day and receiving a time period from the device user, either the intelligent battery processor 213 or another processor 201 of the device 200, depending on implementation, monitors the battery (e.g., output voltage level) to detect the presence of a low battery power condition. If a low battery power condition is detected, the applicable processor 201, 213 determines a present time based on the previously received time information and compares the present time to the time period input by the user. As noted above, when an intelligent battery 205 is used, the intelligent battery processor 213 may interface with the electronic device processor 201 using a predetermined protocol to obtain the present time, or the intelligent battery processor 213 may compute the present time itself if the necessary time information was previously stored in memory 215. If the present time is during the time period, the processor 201, 213 disables the low battery alert circuit 219 from generating a low battery alert signal (e.g., by failing to supply the necessary input signal to the low battery alert circuit 219); otherwise, the processor 201, 213 instructs the low battery alert circuit 217 to generate the low battery alert signal for provision to the speaker 211.

During the user-defined time period, the electronic device 200 may notify the user of a low DC power condition using a tactile or other silent alert, such as a conventional vibrating mechanism, or provide no alert at all depending on the characteristics of the time period or inputs from the user. For example, during an event such as a meeting, the electronic device processor 201 may be programmed (either by default or through user input) to notify the user of the low power condition using a tactile alert because, when the event is something that the user is attending, the electronic device processor 201 can presume that the user of the device 200 is awake and would generally like to be notified of the low power condition. However, if the user-defined time or silent period is a period of time during which people usually sleep (e.g., overnight), the electronic device processor 201 may be programmed (either by default or through user input) to provide no low power alert at all so as not to disturb the user.

In an alternative embodiment, the processor 201, 213 may be programmed to proactively notify the device user, prior to commencement of the user-defined time period, of a potential low battery power condition so that the user may take preemptive measures to prevent the low battery power condition from actually occurring during the time period. In this case, the processor 201, 213, upon receiving the user's input defining the time period, determines whether a low battery or low DC power condition is likely to occur during the time period. Such a determination may be made, for example, by maintaining historical usage data in memory 203, 215 and using conventional extrapolation techniques to project whether, based on the current condition of the battery 217 or other DC power source (e.g., voltage level, time since last charging cycle, integrated measurement of the current previously sourced by the battery 217 or other DC power source, or, with respect to a fuel cell, the chemical properties of the cell or the amount of fuel remaining in or previously used by the cell), the output power of the battery 217 or other DC power source will, with a high probability, drop below a desired output power threshold during the time period. If a low battery power condition is likely to occur during the time period based on the processor's projections, the processor 201, 213 sends a command to the low battery alert circuit 219 instructing the circuit 219 to generate the low battery alert signal for emanation by the speaker 211 prior to commencement of the time period. In this manner, the electronic device 200 or the intelligent battery device 205 notifies the device user ahead of time regarding the potential for a low battery or low power condition during the time period. Such advance notification allows the device user to recharge or change the battery 217 to insure sufficient power capability during the time period, without having to be bothered by an audible notification actually during the time period.

While the components of the electronic device 200 are illustrated as being connected directly together, one of ordinary skill in the art will appreciate that conventional circuits and functional blocks may be inserted in between components 201–219 (and 117, 129 when included) in accordance with known techniques to implement the full functionality of the particular electronic device 200. Thus, the components 201–219 of the electronic device 200 are operably coupled together, either directly as illustrated in FIG. 2 or indirectly, to implement the present invention. In addition, when an intelligent battery device 205 is used, the intelligent battery processor 213 is operably coupleable to the user interface 207 through one or more electrical connectors, printed circuit board traces, and/or processor 201, and the low battery alert circuit 219 is operably coupleable to the speaker 211 through one or more electrical connectors and printed circuit board traces in accordance with conventional external component interfacing techniques.

As described above, the present invention provides various apparatuses (e.g., communication system, electronic device, and intelligent DC power source) that selectively provide an audible low power alert to a user of an electronic device. In contrast to prior art electronic devices, which provide no mechanism for disabling their low battery alerts other than powering off the devices, such apparatuses allow the user to preset a time period during which the audible low power alert will be disabled and the user will not be bothered or interrupted by the beeping, chirping or other audible notification of a low DC power condition. In addition, the foregoing apparatuses provide for advance notification of the potential for a low power condition during the user-defined silent period, thereby enabling the user to take preemptive action to prevent the low power condition from occurring. Such forewarning of a low battery or low power condition is not available in any prior art electronic device.

Figure 3:
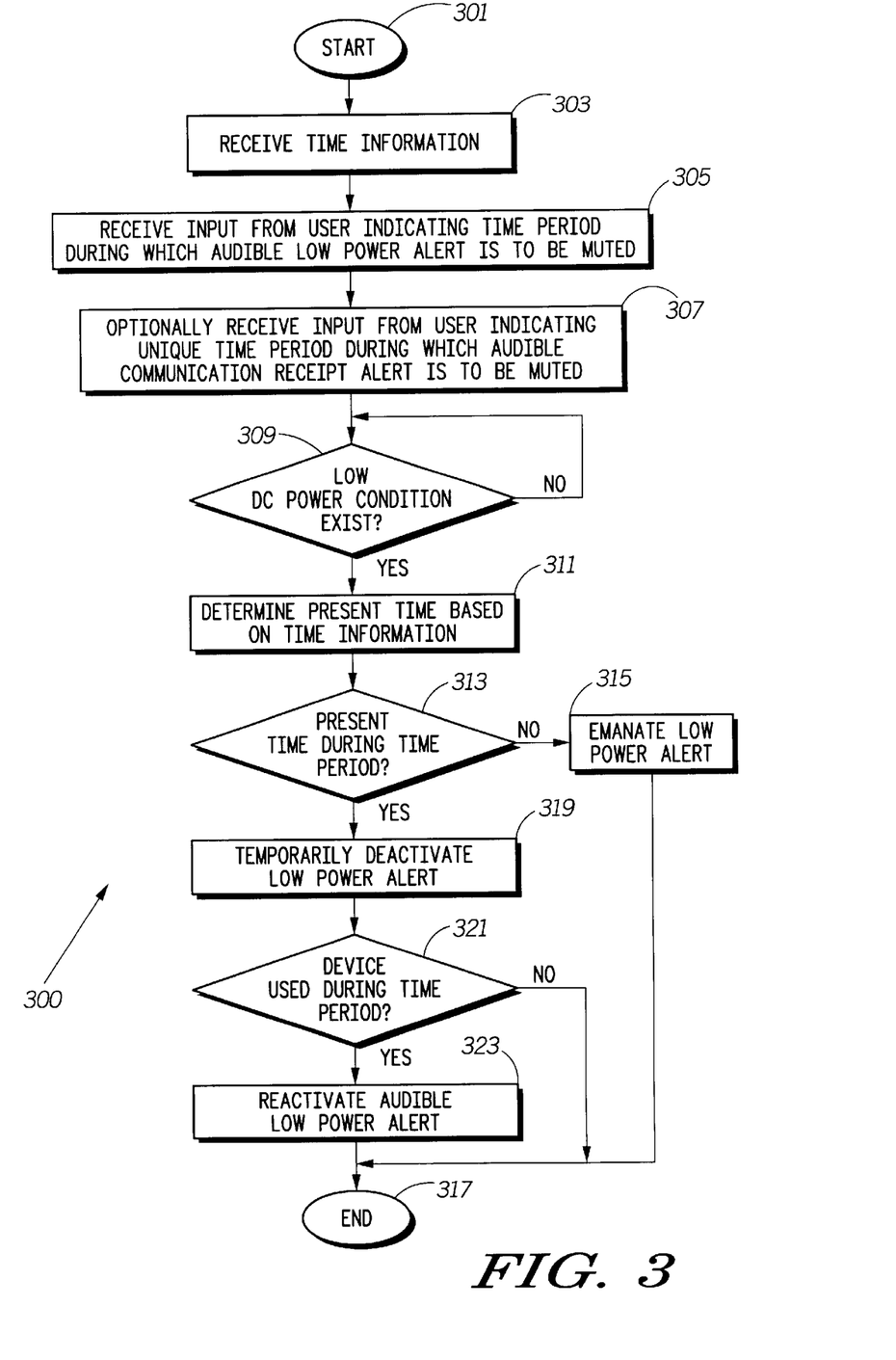
FIG. 3 is a logic flow diagram of steps executed by an electronic device to selectively audibly alert a user as to the status of the DC power source of the device in accordance with one embodiment of the present invention.

FIG. 3 is a logic flow diagram 300 of steps executed by an electronic device to selectively audibly alert a user as to the status of the DC power source of the device in accordance with one embodiment of the present invention. The logic flow begins (301) when the electronic device receives (303) time information to enable it to determine the present time. The time information may be input by the device user (e.g., to set the device's clock) or may be received regularly from a remote controller over a wireless channel (e.g., when the electronic device comprises a wireless communication device). In addition to receiving the time information, the electronic device receives (305) input from the user indicating a time period during which the device's audible low DC power alert (e.g., low battery alert) is to be muted. The time period may be a period of time during the day (e.g., 11:00 PM through 6:00 AM), an event that maps to a time period on an internal calendar of the device, or any other identifiable period of time.

In addition to receiving time information and a time period during which the low DC power alert is to be muted, the electronic device, if implemented as a wireless communication device, may optionally further receive (307) input from the user indicating a unique time period during which an audible communication receipt alert is to be muted. As noted above with respect to FIG. 1, the silent period for the low DC power alert may be independent of and distinct from the silent period for incoming calls or messages.

After the electronic device has received the time information and an indication of the silent period for the audible low DC power alert, the electronic device determines (309) whether a low DC power condition exists. Such a determination is preferably made by measuring an indication of the output power level of the DC power source and comparing it to an applicable threshold (e.g., eighty percent (80%) of full output power). In a preferred embodiment in which the DC power source is a battery, the loaded output voltage of the battery is measured to provide an indication as to the output power level of the battery. Alternatively, a low DC power condition may be determined by measuring the unloaded output voltage of the battery or other power source (e.g., for power sources that do not maintain a relatively constant open circuit voltage substantially until discharge) or using voltage profile curves programmed into the electronic device's processor to more accurately predict the life of the DC power source.

In the event that a low DC power condition does not exist, the electronic device continues monitoring for such a condition. On the other hand, in the event that a low DC power condition does exist, the electronic device determines (311) the present time based on the previously received time information. If the electronic device is not a wireless communication device that regularly receives time updates from a remote controller, the electronic device preferably includes an internal clock that keeps the present time based on the time originally input by the user.

Having determined the present time and the presence of a low DC power condition, the electronic device determines (313) whether the present time is during the time period. If the present time is outside the time period, the electronic device emanates (315) or sounds the audible low power alert and the logic flow ends (317). On the other hand, if the present time is within the time period, the electronic device temporarily deactivates (319) the audible low power alert (e.g., by disabling an internal low battery alert circuit from supplying a low battery alert signal to an internal speaker or by failing to supply a necessary input signal to such an internal low battery alert circuit) to avoid annoying the user with such an alert during the user-defined silent period.

In a preferred embodiment, the audible low power alert remains deactivated for the duration of the silent period. Alternatively, the audible low power alert may be disabled or deactivated for a portion of the user-defined period. For example, the electronic device may be programmed to regularly check the power condition of the DC power source during the user-defined time period (e.g., periodically or according to some other non-linear schedule (e.g., at varying rates depending upon the power condition of the DC power source, with more checks occurring as the power condition of the source worsens)). In such a case, the electronic device may deactivate its low power audible alert on a check-by-check basis or for a predetermined quantity of power condition checks. For instance, the electronic device may be programmed to deactivate the audible alert for a maximum of N consecutive power condition checks that indicate a low DC power condition and then reactivate the audible alert for the $N+1^{st}$ consecutive power condition check that indicate a low DC power condition. Alternatively, the electronic device may be programmed to deactivate the audible low power alert for the duration of the user-defined silent period unless the low DC power condition becomes severe (e.g., the loaded output power of the DC power source drops below another threshold (e.g., twenty percent (20%) of full output power)). Based on the foregoing exemplary embodiments, one of ordinary skill in the art will appreciate that various other algorithms or embodiments may be employed to temporarily deactivate or disable the audible low power alert during at least a portion of the user-defined silent period. Such alternative algorithms and embodiments are intended to be within the spirit and scope of the appended claims.

In a preferred embodiment, the electronic device further determines (321) whether the electronic device is used by the user during the silent period, thereby indicating that the user may desire to be alerted of a low DC power condition although the user may have forgotten to manually reactivate the low power alert system (e.g., change or delete the entry for the silent low battery alert). In such a case, the electronic device preferably automatically reactivates the audible low power alert system when the device is used during the silent period (e.g., by enabling an internal low battery alert circuit to supply a low battery alert signal to an internal speaker or by supplying a necessary input signal to such an internal low battery alert circuit) and, if a low DC power condition is detected, sounds the audible low power alert, thereby ending (317) the logic flow.

Figure 4:
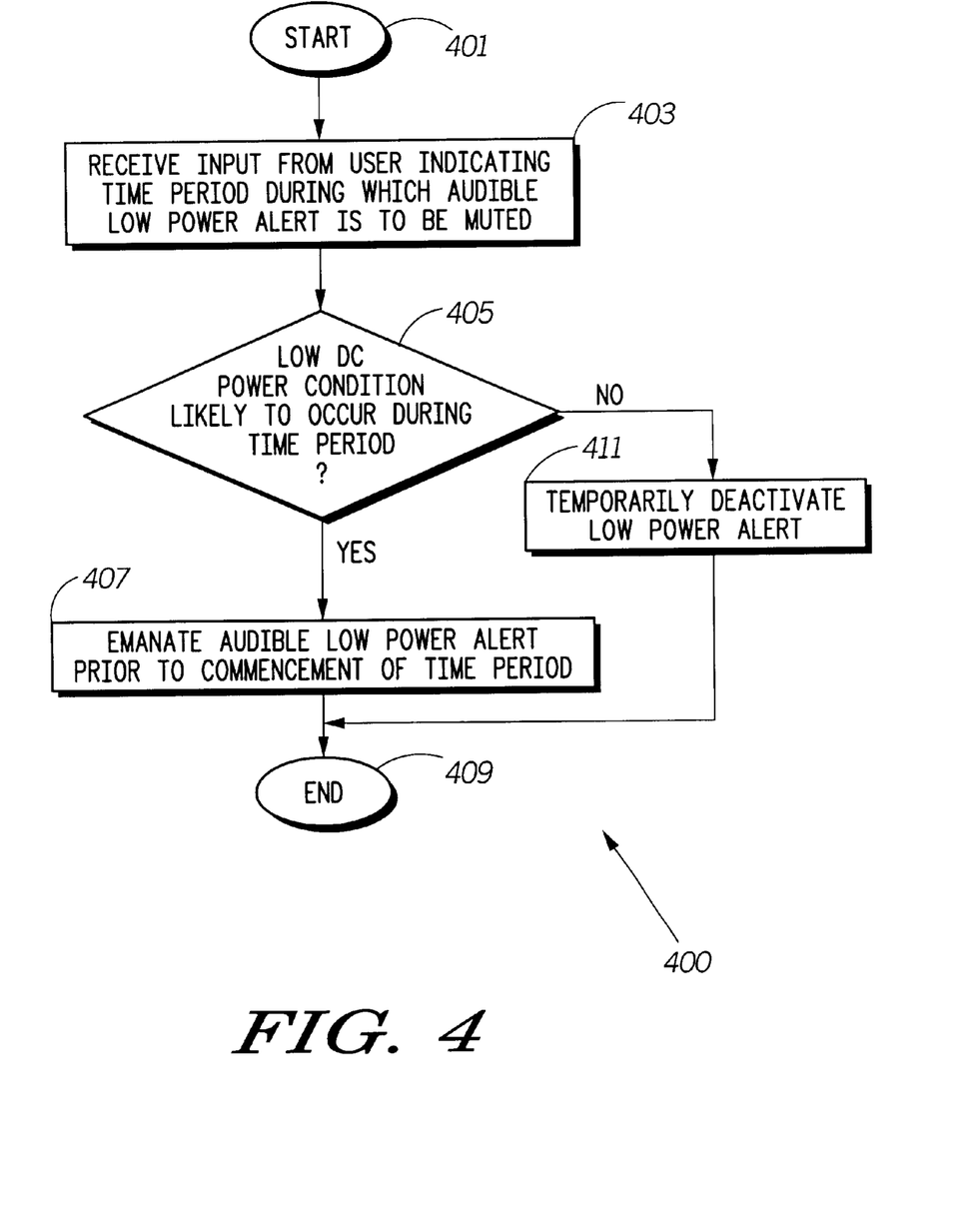
FIG. 4 is a logic flow diagram of steps executed by an electronic device to selectively audibly alert a user as to the status of the DC power source of the device in accordance with an alternative embodiment of the present invention.

FIG. 4 is a logic flow diagram 400 of steps executed by an electronic device to selectively audibly alert a user as to the status of the DC power source of the device in accordance with an alternative embodiment of the present invention. The logic flow begins (401) when the electronic device receives (403) an input from the user indicating a time period during which an audible low power alert is not to be emanated from the device. After receiving such input, the electronic device determines (405) whether a low DC power condition is likely to occur during the user-defined time period. Such a determination is preferably made by examining stored historical usage data for the device during the indicated time period, estimating an amount of power to be used during the time period based on the historical usage data (e.g., by taking an average or a weighted average of the historical usage data), measuring an indicia (e.g., output voltage level) of the current power condition of the DC power source (e.g., battery or fuel cell), and estimating whether the output power of the DC power source will drop below a predetermined threshold during the time period based on the current power condition of the DC power source and the estimated amount of power to be consumed during the time period. If, based on the foregoing computations, the output power of the DC power source is expected to drop below the predetermined threshold during the user-defined time period, a low DC power condition is deemed likely to occur; otherwise, such a condition is deemed unlikely to occur.

The determination of the likelihood of a low DC power condition occurring during the user-defined time period may be made in other ways also. For example, the electronic device may evaluate its current operating mode just prior to commencement of the time period and use the results of such evaluation in combination with the current power condition of the DC power source and/or other data computed as part of the preferred determination to compute the likelihood of a low DC power condition occurring during the time period. For instance, if the device is actively operational (e.g., playing a CD or engaged in a telephone call) just prior to commencement of the time period, as opposed to being in a standby mode (e.g., powered on, but idle), and the power condition of the DC power source is marginal (e.g., the output voltage has dropped a significant amount (e.g., ten percent)), the electronic device may determine that the current usage will continue into the time period and cause a low power condition that would not have been caused if the device was already in standby mode. One of ordinary skill in the art will appreciate that various other methods may be used to determine the likelihood of a low DC power condition occurring during the user-defined time period, such as using various combinations of the above-described determination approaches. Such alternative methods are intended to be within the spirit and scope of the appended claims.

Referring back to FIG. 4, in the event that the electronic device determines that a low DC power condition is likely to occur during the time period, the electronic device emanates (407) or sounds the audible low power alert prior to commencement of the time period to alert the user of the potential for a low DC power condition occurring during the time period, and the logic flow ends (409). If, on the other hand, the electronic device determines that a low DC power condition is not likely to occur during the time period, the electronic device temporarily deactivates (411) the audible low power alert to prevent user disruption during the time period, and the logic flow ends (409).

The process described above with respect to FIG. 4 may be used either independently or as a supplement to the selective alerting process described above with respect to FIG. 3. In the latter case, the electronic device audibly alerts the user prior to commencement of the user-defined time period in the event that a low DC power condition is likely to occur during the time period, but temporarily deactivates the audible low power alert during the time period even if the low DC power condition actually arises, so as not to interrupt or bother the user.

The present invention encompasses a method and apparatus for selectively providing an audible low power alert to a user of an electronic device. With this invention, users can temporarily disable the audible low power alert mechanism (as opposed to the incoming call alert mechanisms of conventional wireless communication devices) during user-defined time periods so as not to be bothered by the alert, without having to shut off their devices. Further, the present invention provides a mechanism for alerting the user, prior to commencement of a user-defined silent period, of the likelihood of a low or no power condition occurring during a time period in which the user does not want to be bothered. Such advance notification enables the user to take preemptive action (e.g., charge the battery), while prohibiting activation of the alert during the silent period. Lastly, the selective audible alert functionality of the present invention may be implemented in any portable DC powered electronic device or in an intelligent or smart DC power source (e.g., battery) that is used in such an electronic device.

In the foregoing specification, the present invention has been described with reference to specific embodiments. However, one of ordinary skill in the art will appreciate that various modifications and changes may be made without departing from the spirit and scope of the present invention as set forth in the appended claims. For example, with respect to FIG. 3, the electronic device need not receive user input indicating a silent period for an incoming call or message, or perform any action based on whether or not the electronic device is used during the silent period in order for the low DC power alerting technique of the present invention to be useful. Also, the steps of the logic flow diagram 300 of FIG. 3 may be rearranged to provide for receipt of the silent period before receipt of the time information and determination of the present time prior to determination of whether or not a low DC power condition exists. One primary aspect of the present invention with respect to FIG. 3 is the determination of whether a low DC power condition exists during the silent period, not the order in which such a determination is made. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for selectively alerting a user of an electronic device as to a status of a direct current (DC) power source of the electronic device, the method comprising the steps of:

receiving an input from the user indicating a time period during which an audible low power alert is not to be emanated from the electronic device;

determining whether a low DC power condition is likely to occur during the time period;

in the event that a low DC power condition is likely to occur during the time period, emanating the audible low power alert from the electronic device prior to commencement of the time period;

determining whether a low DC power condition exists for the DC power source; and in the event that a low DC power condition exists during the time period, temporarily deactivating the audible low power alert.

2. The method of claim 1, further comprising the step of:

in the event that a low DC power condition exists at a time outside the time period, emanating the audible low power alert from the electronic device.

3. The method of claim 1, wherein the electronic device is a wireless communication device, the method further comprising the step of:

receiving another input from the user indicating a time period during which an audible communication receipt alert is not to be emanated from the wireless communication device, wherein the time period during which an audible communication receipt alert is not to be emanated is different than the time period during which an audible low power alert is not to be emanated.

4. The method of claim 1, wherein the electronic device is a wireless communication device, the method further comprising the steps of:

receiving time information over a wireless communication channel; and determining a present time based on the time information, the present time being used to determine whether the low DC power condition exists during the time period.

5. The method of claim 1, further comprising the steps of:

determining whether the electronic device is used by the user during the time period; and in the event that the electronic device is used during the time period, reactivating the audible low power alert.

6. The method of claim 1, wherein the time period comprises a period of time during a day.

7. The method of claim 1, wherein the time period comprises a period of time associated with an event.

8. A method for selectively alerting a user of an electronic device as to a status of a DC power source of the electronic device, the method comprising the steps of:

receiving an input from the user indicating a time period during which an audible low power alert is not to be emanated from the electronic device;

determining whether a low DC power condition is likely to occur during the time period; and in the event that a low DC power condition is likely to occur during the time period, emanating the audible low power alert from the electronic device prior to commencement of the time period.

9. The method of claim 8, further comprising the step of:

in the event that a low DC power condition is not likely to occur during the time period, temporarily deactivating the audible low power alert.

10. An electronic device comprising:

a direct current (DC) power source;

a circuit for generating an alert signal;

a speaker, operably coupled to the circuit, for emanating an audible alert in response to the alert signal;

a user interface that receives an input from a user indicating a time period during which the audible alert is not to be emanated from the speaker;

a processor, operably coupled to the user interface, the circuit and the DC power source: and a memory operably coupled to the processor, the memory including operating instructions that, when executed by the processor, control the processor to:

determine whether a low DC power condition is likely to occur during the time period;

instruct the circuit to generate the alert signal prior to commencement of the time period in the event that a low DC power condition is likely to occur during the time period;

determine whether a low DC power condition exists during the time period based on an output power of the DC power source; and disable the circuit from generating the alert signal in the event that the low DC power condition exists during the time period.

11. The electronic device of claim 10, wherein the memory includes additional operating instructions that, when executed by the processor, control the processor to enable the circuit to generate the alert signal in the event that the low DC power condition exists outside the time period.

12. The electronic device of claim 10, wherein the electronic device is a wireless communication device, wherein the user interface receives another input from the user indicating a time period during which an audible communication receipt alert is not to be emanated from the wireless communication device, and wherein the time period during which an audible communication receipt alert is not to be emanated is different than the time period during which an audible low power alert is not to be emanated.

13. The electronic device of claim 10, wherein the electronic device is a wireless communication device and wherein the wireless communication device further comprises:

a receiver, operably coupled to the processor, for receiving time information over a wireless communication channel, wherein the memory includes additional operating instructions that, when executed by the processor, control the processor to determine a present time based on the time information received by the receiver, the present time being used to determine whether the low DC power condition exists during the time period.

14. The electronic device of claim 13, wherein the receiver is at least partially integrated into an integrated circuit that contains the processor.

15. The electronic device of claim 10, wherein the circuit is at least partially integrated into an integrated circuit that contains the processor.

16. The electronic device of claim 10, wherein the DC power source comprises a battery and wherein at least the battery, the circuit, and the processor form part of an intelligent battery device.

17. An electronic device comprising:

a direct current (DC) power source;

a circuit for generating a low power alert signal;

a speaker, operably coupled to the circuit, for emanating an audible low power alert in response to the low power alert signal;

a user interface that receives an input from a user indicating a time period during which the audible low power alert is not to be emanated from the speaker;

a processor, operably coupled to the user interface, the circuit and the DC power source; and a memory operably coupled to the processor, the memory including operating instructions that, when executed by the processor, control the processor to:
  determine whether a low DC power condition is likely to occur during the time period; and
  instruct the circuit to generate the low power alert signal prior to commencement of the time period in the event that a low DC power condition is likely to occur during the time period.

18. An intelligent battery for use with an electronic device, the electronic device including a user interface and a speaker, the user interface receiving an input from a user indicating a time period during which an audible low battery alert is not to be emanated from the electronic device and the speaker emanating a low battery alert in response to a low battery alert signal, the intelligent battery comprising:

a battery;

a circuit, operably coupleable to the speaker, for generating the low battery alert signal;

a processor, operably coupled to the circuit and the battery and operably coupleable to the user interface; and a memory operably coupled to the processor, the memory including operating instructions that, when executed by the processor, control the processor to:
  determine whether a low battery power condition is likely to occur during the time period;
  instruct the circuit to generate the low battery alert signal prior to commencement of the time period in the event that a low battery power condition is likely to occur during the time period;
  determine whether a low battery power condition exists during the time period based on an output power of the battery; and
  disable the circuit from generating the low battery alert signal in the event that the low battery power condition exists during the time period.

19. An intelligent battery for use with an electronic device, the electronic device including a user interface and a speaker, the user interface receiving an input from a user indicating a time period during which an audible low battery alert is not to be emanated from the electronic device and the speaker emanating a low battery alert in response to a low battery alert signal, the intelligent battery comprising:

a battery;

a circuit, operably coupleable to the speaker, for generating the low battery alert signal;

a processor, operably coupled to the circuit and the battery and operably coupleable to the user interface; and a memory operably coupled to the processor, the memory including operating instructions that, when executed by the processor, control the processor to:
  determine whether a low battery power condition is likely to occur during the time period; and
  instruct the circuit to generate the low battery alert signal prior to commencement of the time period in the event that a low battery power condition is likely to occur during the time period.

20. A communication system comprising:

a base transceiver site that includes:
  a first receiver for receiving time information from a time source;
  a transmitter for transmitting the time information over a wireless communication channel; and
  a controller, operably coupled to the first receiver and the transmitter, for controlling receipt and transmission of the time information; and a communication device that includes:
  a direct current (DC) power source;
  a circuit for generating a low power alert signal;
  a speaker, operably coupled to the circuit, for emanating an audible low power alert in response to the low power alert signal;
  a user interface that receives an input from a user indicating a time period during which the audible low power alert is not to be emanated from the speaker;
  a second receiver for receiving the time information over the wireless communication channel;
  a processor, operably coupled to the user interface, the circuit, the DC power source and the receiver; and
  a memory operably coupled to the processor, the memory including operating instructions that, when executed by the processor, control the processor to:
    determine whether a low DC power condition exists based on an output power of the DC power source;
    determine a present time based on the time information;
    determine whether a low battery power condition is likely to occur during the time period;
    instruct the circuit to generate the low battery alert signal prior to commencement of the time period in the event that a low battery power condition is likely to occur during the time period;
    determine whether the present time is during the time period; and
    disable the circuit from generating the low power alert signal in the event that the present time is during the time period and a low DC power condition exists.

* * * * *